US007000371B2

(12) United States Patent
Viaud

(10) Patent No.: US 7,000,371 B2
(45) Date of Patent: Feb. 21, 2006

(54) LARGE ROUND BALER COMBINED WITH A BALE PROCESSING ARRANGEMENT LOCATED FOR RECEIVING A FORMED BALE

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 120 days.

(21) Appl. No.: 10/726,998

(22) Filed: Dec. 3, 2003

(65) Prior Publication Data

US 2004/0134177 A1 Jul. 15, 2004

(30) Foreign Application Priority Data

Dec. 7, 2002 (DE) ................................ 102 57 252

(51) Int. Cl.
*A01F 15/07* (2006.01)
*B65B 63/04* (2006.01)

(52) U.S. Cl. ............................ 53/587; 53/588; 56/341; 100/88; 414/24.5

(58) Field of Classification Search .................. 53/118, 53/587, 588; 100/5, 87–89; 56/341; 414/24.5; B65B 63/04; A01F 15/07
See application file for complete search history.

(56) References Cited

U.S. PATENT DOCUMENTS 2,581,542 A * 1/1952 Kolzing ....................... 56/341
4,815,266 A * 3/1989 Ratzlaff et al. ............... 56/341
5,263,410 A * 11/1993 Olin ............................ 100/88
5,822,967 A 10/1998 Hood et al.
6,240,712 B1 6/2001 Meijer
6,341,470 B1 * 1/2002 Lacey ......................... 53/176

FOREIGN PATENT DOCUMENTS

DE 40 21 307 A1 1/1992
DE 29711213 * 10/1997
DE 196 54 982 A1 6/1998
EP 0424192 * 4/1991
EP 0 865 723 3/1998
EP 1077025 * 2/2001
EP 1 210 861 A2 6/2002
WO WO 96/12399 * 5/1996
WO WO 01/24610 * 4/2001

* cited by examiner

*Primary Examiner*—Stephen F Gerrity

(57) ABSTRACT

A large round baler is equipped with a bale processing arrangement in the form of a bale wrapping arrangement. A wrapping table is mounted to a guide arrangement for guided movement between a bale-receiving position and bale wrapping and bale discharge positions. The guide arrangement includes two sections, one of which can be moved to a near vertical non-operating position so as to diminish the overall length of the baler and processing arrangement. The wrapping arm of the bale wrapping arrangement can be dismounted for an operating mode where formed bales are deposited directly on the ground by the wrapping table.

4 Claims, 12 Drawing Sheets

LARGE ROUND BALER COMBINED WITH A BALE PROCESSING ARRANGEMENT LOCATED FOR RECEIVING A FORMED BALE

FIELD OF THE INVENTION

The Invention concerns a baler, in particular a large round baler with a baling chamber, with an outlet for the baling chamber and a further processing arrangement, that is arranged downstream of the outlet and is provided with a conveying table that can be moved to the outlet in at least one guide.

BACKGROUND OF THE INVENTION

DE 40 21 307 A1 describes a large baler with a wrapping arrangement for slab shaped bales that are lined up as small bales in the form of a queue with their end faces aligned with each other, but also may be wrapped individually.

A wrapping arrangement for small bales of grass or straw that can be attached to a vehicle and that is appropriate for wrapping small bales of circular or rectangular cross section with foil is disclosed by DE 196 54 982 A1.

A large round baler combined with a wrapping arrangement is known from U.S. Pat. No. 5,882,967 in which two rolls with wrapping material are rotated about a vertical axis where during a wrapping process a bale can be rotated about a horizontal axis. An arm supporting the wrapping arrangement extends in a non-operating position over a certain length beyond the large round baler, which is relatively unfavorable during maneuvering. Furthermore, the rotating arms with the rolls must be brought into a non-operating position at the side during each loading and unloading process of the bale.

Finally, EP 1 210 861 A2 shows a large round baler with a wrapping arrangement attached to the rear, that can be disassembled when in a non-operating condition. However, during the operation, the combination results in a relatively long assembled length for the entire train.

The problem underlying the invention is seen in the fact that known large round balers cannot be equipped with wrapping arrangements without contributing to excessive length.

SUMMARY OF THE INVENTION

According to the present invention, there is provided an improved combined large round baler and wrapping arrangement.

An object of the invention is to provide a crop processing arrangement in combination with a large round baler, with the crop processing arrangement being constructed for having certain components movable to non-operating positions which keep the length and width dimensions of the combined baler and processing arrangement to a minimum.

This structure permits a bale to be made in the baling chamber in a known manner and unloaded from the baler so as to be weighed in a further processing arrangement or to be enclosed in wrapping material in a wrapping arrangement. The further processing arrangement can be equipped in particular as a weighing arrangement. If necessary, further measurements may be performed, for example, an optical volume determination, a moisture measurement or the like. In an embodiment of the invention, the further processing arrangement may be configured as a wrapping implement that is arranged behind the baling chamber in an operating position and that can be brought into a space-saving non-operating position. The baler may be a large round baler with a fixed or a variable volume baling chamber as well as a baler for making large rectangular bales.

For this purpose, guides are preferably provided for a conveying table of which at least one part can be brought to the outer edges of the baler in a non-operating position. The guides may be provided to great advantage at least partially at a pivoting frame, that simultaneously provides a support for the conveying table or the wrapping table. By the use of an actuating arrangement in the form of a hydraulic drive or the like, the pivoting frame can be brought into its space-saving non-operating position, in which the baler exhibits a clearly reduced length. The first and the second guides can also be combined in a single guide.

The conveying table can be used simultaneously as a deposit arrangement as well as a wrapping table for the wrapping implement. Several actuating devices are used to slide the conveying table between a take-over position, to take over a completed bale, and a deposit position for the deposit of the bale on the ground, each of which is connected in a joint to the frame of the baler as well as to further coupling rods. The actuating arrangements may be configured as resilient, if desired for example, supported on springs on the frame or against each other. The actuating devices may use a spring configured as a gas spring or a mechanical spring. A pressurized medium, such as oil or gas, can be used whose escape can be controlled by valves. The impact of a moving bale can be damped thereby. Such a resilient support reduces the mechanical load on the rigid as well as the flexible components and can extend the life and reduce wear during the agricultural operation.

A further reduction of the dimensions of the baler can be attained by bringing the wrapping arms of the further processing arrangement that was configured as a wrapping device, into a non-operating position. In particular, the wrapping arms may be configured as tow-piece components and pivoted against each other about a vertical axis of rotation and brought in the direction of the rear of the baler. Together with the further processing arrangement that was pivoted upward, for example, its pivoting frame can be configured very short in this operating position.

The wrapping arms can be brought into their non-operating position by means of servo motors. The servo motors may be driven as electric motors by hydraulic or pneumatic power.

Preferably, the movements of the further processing arrangement are connected to those of the wrapping arrangement. In this way, provision can be made that in a non-operating condition of the conveying table as well as that of the pivoting frame, the wrapping arms of the wrapping device remain forcibly folded inward. The servo motors of the conveying table or of the wrapping table and/or those of the wrapping arms are preferably controlled as a function of at least one signal from a further adjustable component of the baler. The various operating positions of the baler may preferably be controlled by a program, where the various programs are selected by a central on-board computer of a towing vehicle.

A particular advantage of the baler, according to the invention, lies in the possibility of performing a nearly continuous operation. While a completed bale is weighed, measured, and/or wrapped with foil in the following further processing arrangement and subsequently deposited on the ground, another bale can simultaneously be produced in the baling chamber. Only during its transfer to a conveying table located underneath the baling chamber, the baling operation is briefly interrupted, since for this step the baling forming arrangement must be removed from contact with the bale. As s rule, however, this interruption is so short that it can be equalized if necessary by the conveying arrangement, without causing a stoppage of the flow of the crop in or ahead of the inlet.

The baler can be operated in all of the variations described basically in at least two differing operating modes. In the first mode, the baling chamber is followed by the further processing arrangement and the second guides for the conveying table are in their operating position. The bale taken out of the baling chamber remains initially on the baler, before it is deposited on the ground. The length of this configuration is increased correspondingly relative to a pure baler. In a second mode, the further processing arrangement is omitted and the bale is deposited on the ground immediately after the baling operation is finished. Here, the further processing arrangement is located in a non-operating position and the conveying table is not slid into the second guides. In this mode, the baler is clearly more compact, so that this second mode is particularly appropriate for operation on public roads.

BRIEF DESCRIPTION OF THE DRAWINGS

The drawing shows embodiments of the invention that shall be described in greater detail in the following.

DESCRIPTION OF THE PREFERRED EMBODIMENT

Figure 1:
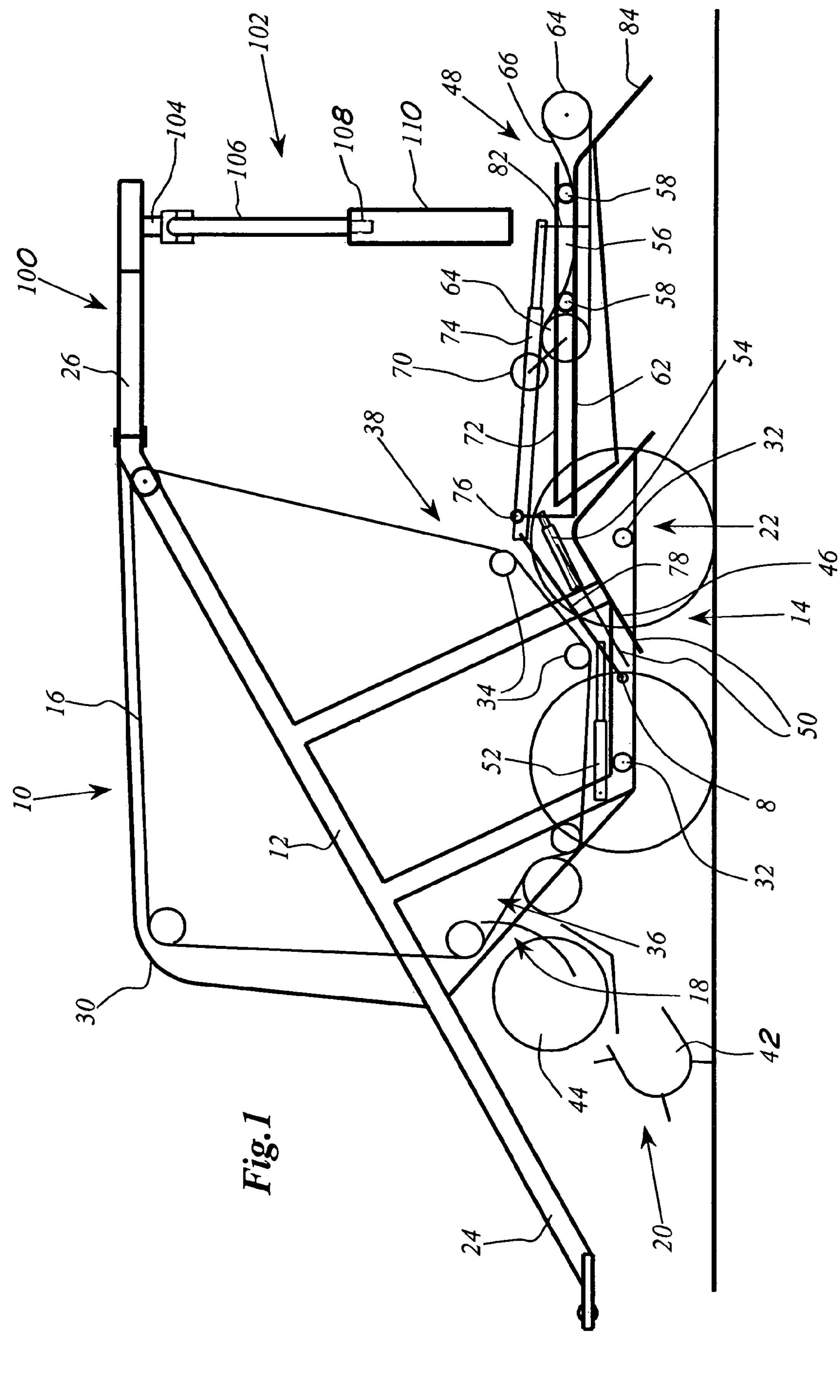
FIG. 1 shows a schematic side view of the baler with a following further processing arrangement in the form of a wrapping implement.

FIG. 1 shows a baler 10 configured as a large round baler with a following further processing arrangement 102 configured as a wrapping implement 100.

In the embodiment shown, the baler 10 is provided with a frame 12, a chassis 14, baling elements 16, a baling chamber 18, a supply arrangement 20, and a conveyor 22. Fundamentally, the baler 10 can be configured in any conventional configuration with a fixed or a variable baling chamber and can be applied in agriculture as well as in industrial applications. Preferably, the baler 10 is configured according to German published patent application 101 53 540.6, which corresponds to U.S. Pat. No. 6,745,681, whose disclosure is hereby incorporated into this case.

The frame 12 is formed by a welded and/or bolted assembly that ends at the front in a towbar 24, is connected at the bottom with the chassis 14, and is provided at the rear with an upper extension 26 of the further processing arrangement 102 or of the wrapping implement 100. Between side cheeks of the frame 12, not described in any further detail, side walls 30 are provided between which the baling chamber 18 is accommodated. The extension 26 can be connected to the frame 12 by a forced connection that is only indicated and that can be released.

The chassis 14 may be configured in a tandem-axle configuration with two axles 32 as it is shown in the figures or it may include only a single sprung or unsprung axle that carries a wheel on each side. The chassis 14 is located underneath the baling chamber 18 and somewhat behind it.

In the embodiment shown, the baling elements 16 are configured as flexible, endless tension elements, such as, for example, belts, bands, bar chains, etc. The baling elements 16 are conducted over rolls 34 and generally surround the baling chamber 18. The rolls 34 are supported in bearings, some of which are located in fixed locations in opposite side walls of the baling chamber 18, and others of which are located in arms that are pivotally mounted, in a known manner, and are biased so that they move in response to a growing bale. Thus, the use of movably supported rolls 34 results in a baling chamber 18 of variable size. In the forward region, that is facing the supply arrangement 20 of the baling chamber 18, the baling elements 16 form an inlet 36, through which crop to be baled can be conveyed into the baling chamber 18. In the rear lower region of the baling chamber, an outlet 38 is formed, when the corresponding rolls 34 with the baling elements 16 are raised and thereby open the baling chamber 18.

A baling chamber could also be formed whose size is invariable and that is surrounded, for example, by rolls or bands whose locations are fixed. The baling chamber 18 is oriented in such a way that a bale 40 contained in it rotates about a central, horizontal imaginary cylinder axis that extends transverse to the direction of operation. In the case of a rectangular baler producing slab-shaped bales, the baling chamber would be rigid.

In the embodiment described, the supply arrangement 20 includes a take-up device 42 in the form of a so-called pick-up and a following conveying arrangement 44 that may be configured, if necessary, as a cutter head which follows the take-up device 42. The take-up device 42 and the conveying arrangement 44 take up crop lying on the ground and convey it through the inlet 36 into the baling chamber 18, where it is formed into a bale.

The conveyor 22 is provided with a roof-shaped frame 46 that is rigidly connected to the frame 12 of the baler 10. Furthermore, the conveyor 22 includes a conveying table 48, a first guide 50, a first actuating arrangement 52, a second actuating arrangement 54, and a third actuating arrangement 74. Essentially, the conveyor 22 is required to take up a bale delivered by the baling chamber 18, and either to convey it to the further processing arrangement 102 or to deposit it on the ground.

The frame 46 includes the first guide 50, in which a slide 56 with rolls 58 can be guided. A pivoting joint 76 is arranged above the frame 46 about which a pivoting frame 62 can be moved between a horizontal position to take up a bale 40 processed in the wrapping implement 100 as well as for its deposit into a position pivoted upward. The pivoting frame 62 is provided with a second guide 72, along which the slide 56 can slide in a parallel direction to the pivoting frame 62. In the illustration of FIG. 1, the slide 56 is located in a rear position at a rear end of the pivoting frame 62, in which a bale 40 lying upon it can be provided with an enclosure by means of the wrapping implement 100.

The slide 56 can engage with its rolls 58 the first guide 50 of the frame 46, where it can be moved in a direction inclined towards the ground. The slide 56 can also engage with its rolls 58 in the second guide 72 of the pivoting frame 62, where it can be moved in a direction parallel to the ground.

The conveying table 48 includes at least two rolls 64 that are supported in bearings, free to rotate, on the slide 56, and are spaced from each other at a distance less than the diameter of a finished bale 40. In the preferred embodiment, an endless band 66 is slung over the rolls 64 that bridges the spacing between the rolls 64 and sags to a small extent between rolls 64. Basically, such a band 66 is not required, and in its place further rolls could be provided. On the side of the slide 56 facing away from the wrapping implement 100, a further roll 70 is provided alongside the roll 64, which may be provided with a smaller diameter than the remaining rolls 64, and hence is offset from a plane through the axis of rotation of the remaining rolls 64, that results in a trough shape for the conveying table 48. The rolls 64 may be configured as rotating freely or may be driven. In the preferred embodiment shown, one of the two rolls 64 is driven, for example, by means of a hydraulic motor.

The first guide 50 formed by the frame 46 consists in the simplest case of two U-shaped rails parallel to the longitudinal center plane of the baler 10 that can be bolted to the frame 12 of the baler 10 and that open in the direction towards its longitudinal center plane. The first guide 50 extends in a roof shape at first initially at an inclination of approximately 30° upward and to the rear, then forms a bend and extends at an inclination of approximately 30° to the ground downward and to the rear. In the embodiment shown, the highest point of the first guide 50 with the bend is located approximately above the rearmost axle of the two axles 32 of the chassis 14 and in the region of the outlet of the second guide 72.

Figure 4:
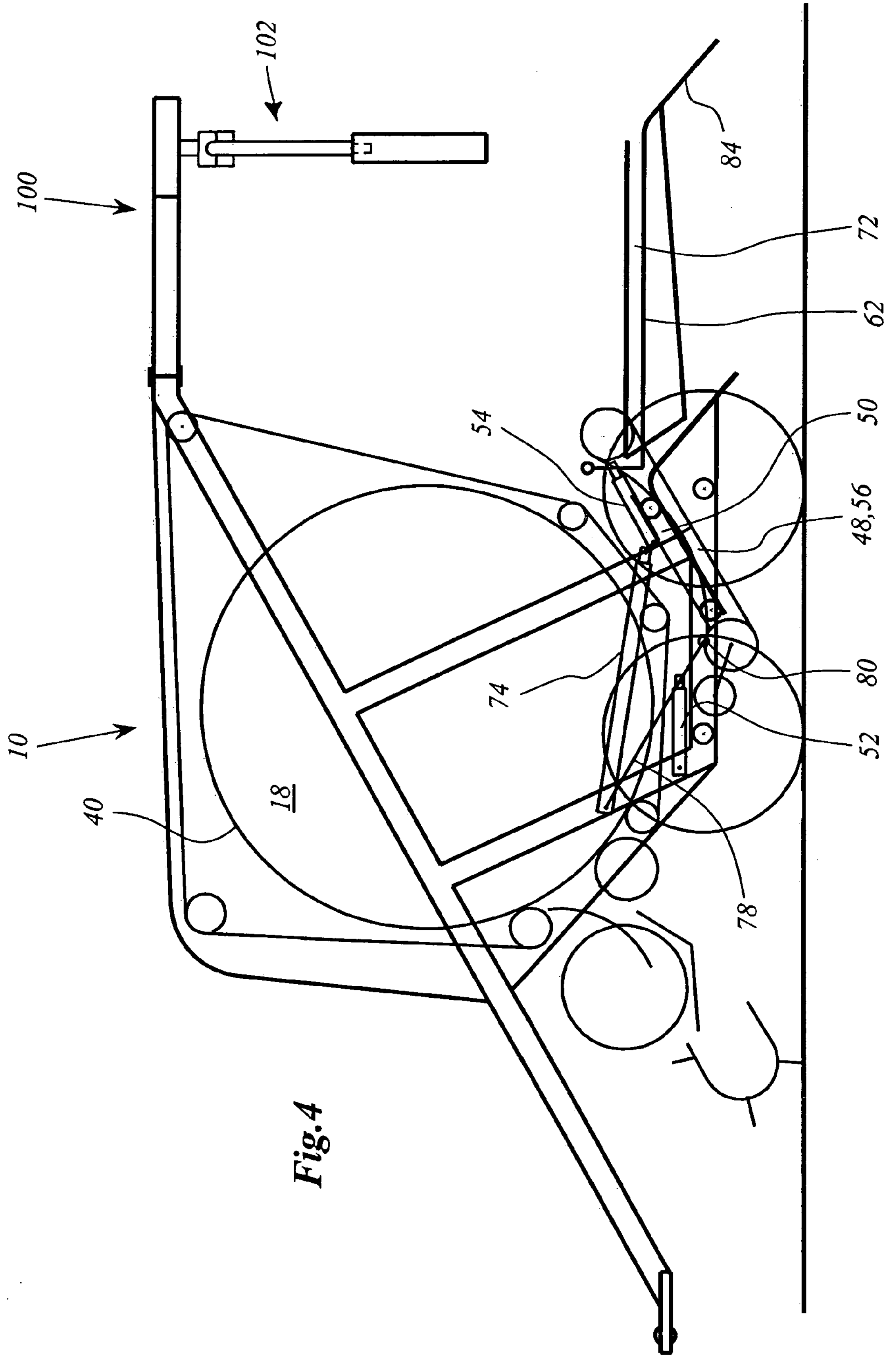
FIG. 4 shows the baler according to FIG. 1 in a take-over position of a conveying table.

The second guide 72 that is formed in, at or on the pivoting frame 62 may consist, the same as the first guide, for example, of two parallel U-shaped rails that open towards the longitudinal center plane of the baler 10. The second guide 72 may be provided with a horizontal course or with a steeply inclined course directed to the rear and towards the ground, as is made clear on the basis of FIGS. 4 and 5. When the pivoting frame 62 is pivoted upward, the slide 56 is located not within the second guide 72, but is guided at all times by the first guide 50.

The baler 10 is provided with a total of three actuating arrangements 52, 54, and 74. The first actuating arrangement 52 is arranged horizontally and is preferably configured as a double-acting hydraulic cylinder and is connected in joints with one end to the frame 12 and at its other end with a coupling rod 78. The coupling rod 78 is connected at one end by means of a coupling joint 80, free to pivot, to the frame 12 and carries in its other end the third actuating arrangement 74. Its opposite end, that can be extended, is connected in a joint to a driver rod 82, which is rigidly connected to the slide 56. The third actuating arrangement 74 is also preferably configured as a double-acting hydraulic cylinder. The second actuating arrangement 54 is preferably configured as a single-acting hydraulic cylinder and is supported in bearings at one end, free to pivot, on the frame 12, and is connected at its other end in a joint, free to pivot, to the pivoting frame 62. The actuating arrangements 52,54 and 74 are preferably controlled by means of electromagnetically controlled valves, not shown, from an on-board computer or manually.

Fundamentally, the three actuating arrangements 52, 54, and 74 could also be operated mechanically, electrically or pneumatically or by a combination of these operating arrangements.

Figure 2:
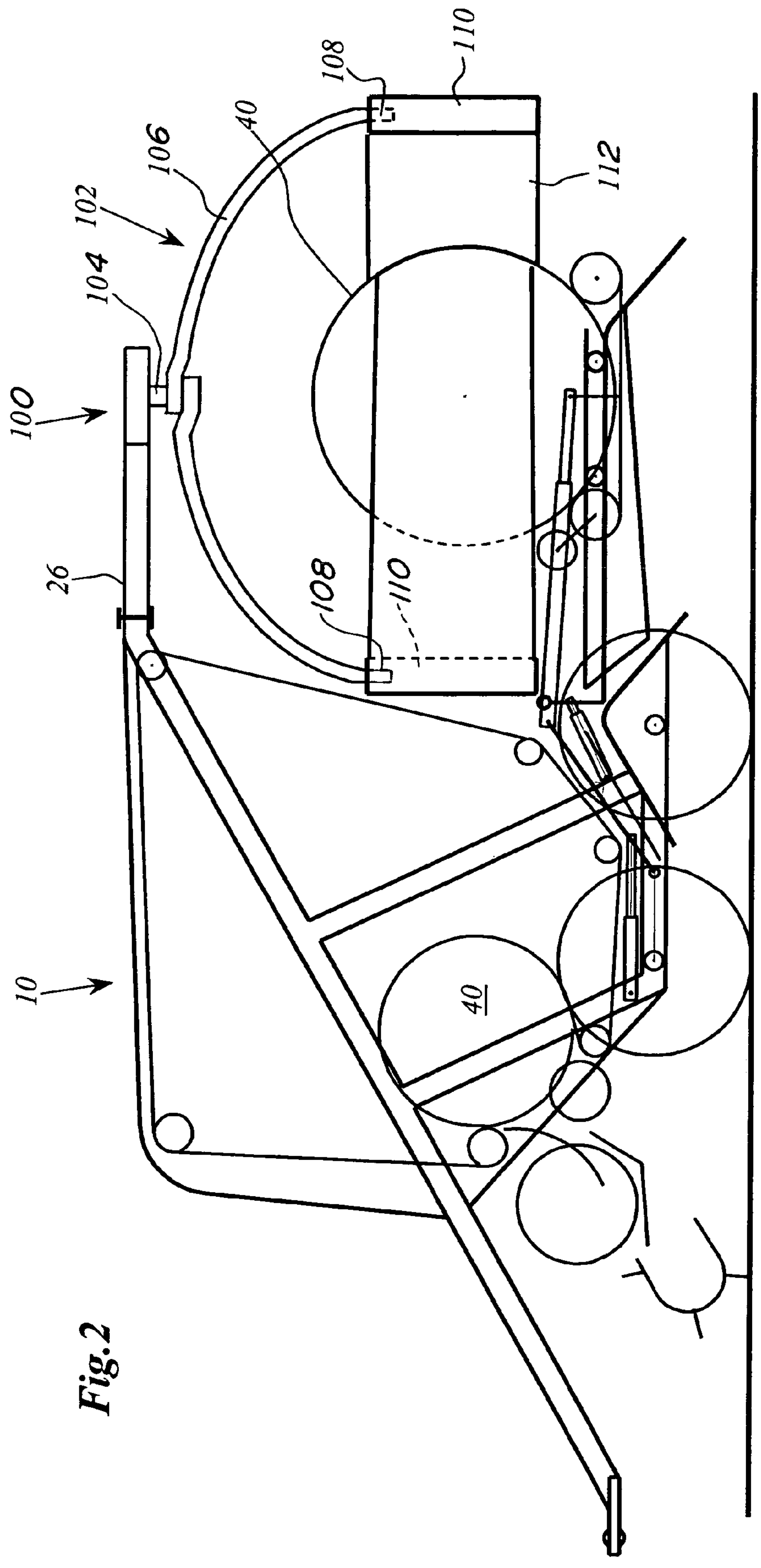
FIG. 2 shows the bale of FIG. 1 with a further processing arrangement in its operating position.

FIGS. 1 and 2 show the first actuating arrangement 52 in its extended position. Since the first actuating arrangement 52 is connected in a joint to the coupling rod 78 slightly above the coupling joint 80, the coupling rod 78 is thereby pivoted in the direction towards the rear. The third actuating arrangement 74 that is connected in a joint to the other end of the coupling rod 78 is located at approximately half of its total extension. The slide 56 with the conveying table 48 is coupled by the driver rod 82 to the third actuating arrangement 74 and can be slid along the second guide 72. It is located in a horizontal position in a rear region of the second guide 72 of the pivoting frame 62, so that a bale 40 located on the conveying table 48 is now located immediately underneath the wrapping implement 100. The single-acting hydraulic cylinder of the second actuating arrangement 54 is in its retracted condition, so that the pivoting frame 62 is in contact with a mechanical stop and is in a horizontal position.

The wrapping implement 100 includes the extension 26, that in the position shown in FIGS. 1 and 2, extends to and across the conveying table 48, that reaches to the rear in the horizontal direction, that can be rotated about a vertical axis of rotation and consists of a two-piece wrapping arm 102, and is used to enclose a bale 40 formed in the baler 10 air-tight with a foil in order to produce silage for forage.

The wrapping arm 102 is provided with a drive, not shown here, with a vertical output shaft 104. Furthermore, the two-piece wrapping arm 102 includes a wrapping rotor 106 in the form of an inverted "U to each of whose vertical legs 108 a foil dispenser 110 is attached. The wrapping rotor 106 is connected centrally to the output shaft 104 and is rotated by means of the drive about its central axis, while in the free interior space between the legs 108, the bale 40 is supported on the conveying table 48 and is wrapped with foil 112 that was unwrapped from the foil dispenser 110 (see FIG. 2). As can be seen clearly on the basis of FIG. 2, the extension 26 must be provided with sufficient length so that the wrapping arm 102 does not collide with the baling chamber 18 or with the baling elements 16 of the baler 10.

Figure 3:
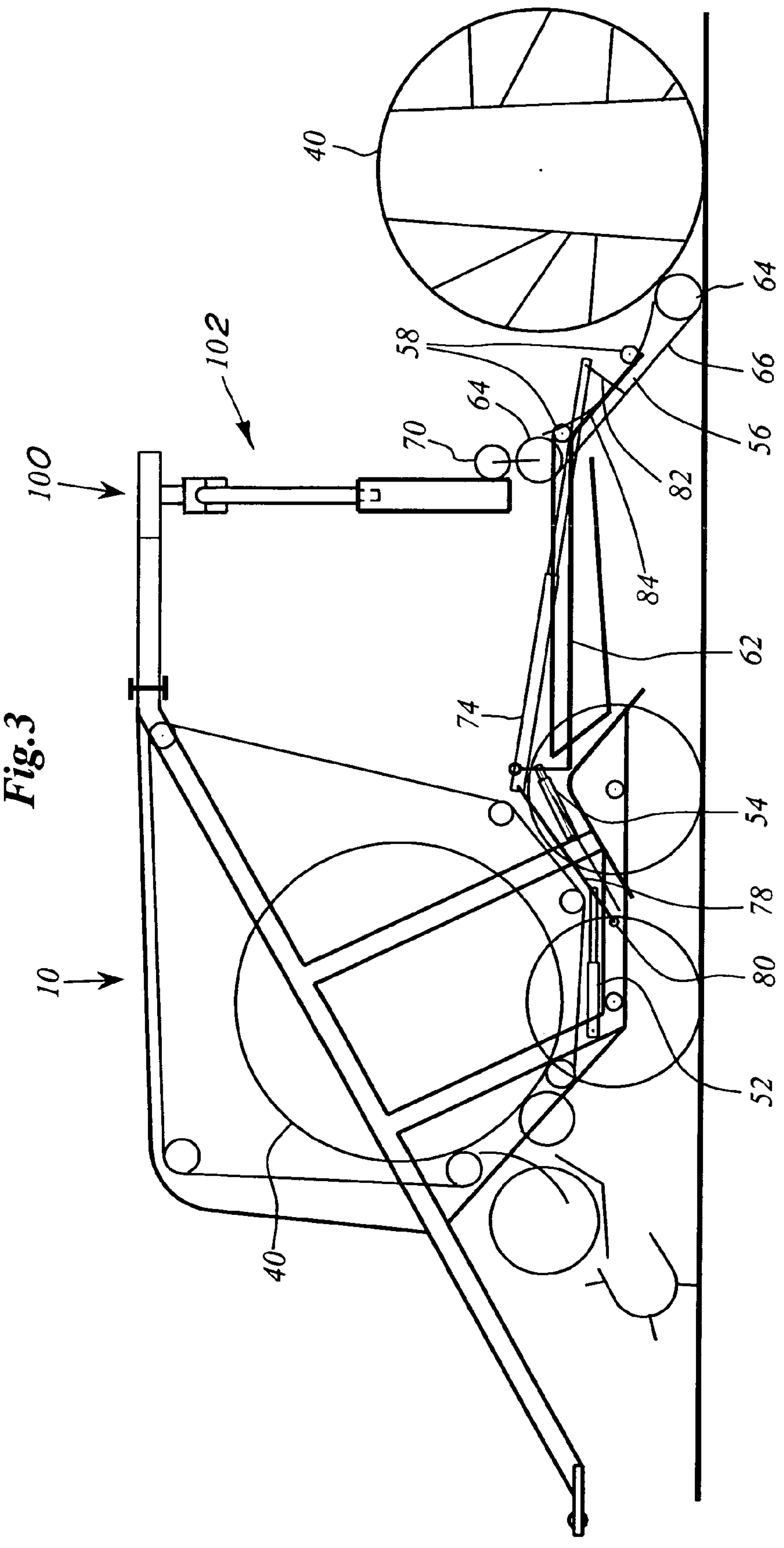
FIG. 3 shows the baler according to FIG. 1 in a position for the unloading of a bale.

On the basis of FIGS. 2 and 3, it can be seen clearly that the baler 10 permits a continuous operation, since a finished bale 40 is deposited on the conveying table 48, moved away by it from the baling chamber 18 and is wrapped with foil 112 by means of the wrapping implement 100, while in the baling chamber 18, a further bale 40 is already being formed.

FIG. 3 shows the deposit of the finished bale 40 on the ground behind the baler 10 that is moving further along, which is accomplished by pivoting the conveying table 48 to the rear and downward. For this purpose, the third actuating arrangement 74 is fully extended and slides the slide 56 over the driver rod 82 beyond the wrapping position shown in FIGS. 1 and 2. The rolls 58 of the slide 56 at this time slide in or on the pivoting frame 62, which is provided with a rear ramp section 84 that is inclined downward at an angle. This ram section 84 is bent away from the horizontal section of the second guide 72 in the pivoting frame 62 at an angle of approximately 30° downward and permits a change in direction of the slide 56 together with the conveying table 48 located upon it through an inclination that permits the bale 40 lying upon it to roll off it to the rear. This deposit of the bale 40 on the ground can be supported by a corresponding advance movement of the endless band 66.

As soon as the bale 40 has been deposited, the conveying table 48 can be slid to a forward position in order to take over the next bale 40 from the baling chamber 18 that then has been opened. This forward take-over position of the conveying table 48 is made clear on the basis of FIG. 4. For this purpose, the first actuating arrangement 52 is brought into its retracted position whereby the coupling rod 78 that is connected in a joint at the bottom of the frame 12 along with the third actuating arrangement 74 is pivoted in a direction towards the baling chamber 18. The third actuating arrangement 74 is also located in its retracted position so that with this, the slide 56 and the conveying table 48 are slid out of the second guide 72 over the driver rod 82 of the pivoting frame 62 into the first guide 50 of the frame 46. Here, the second actuating arrangement 54 remains preferably in the retracted position shown in FIG. 4, whereby the pivoting frame 62 that is coupled to it also remains in the horizontal operating position underneath the wrapping implement 100.

Figure 5:
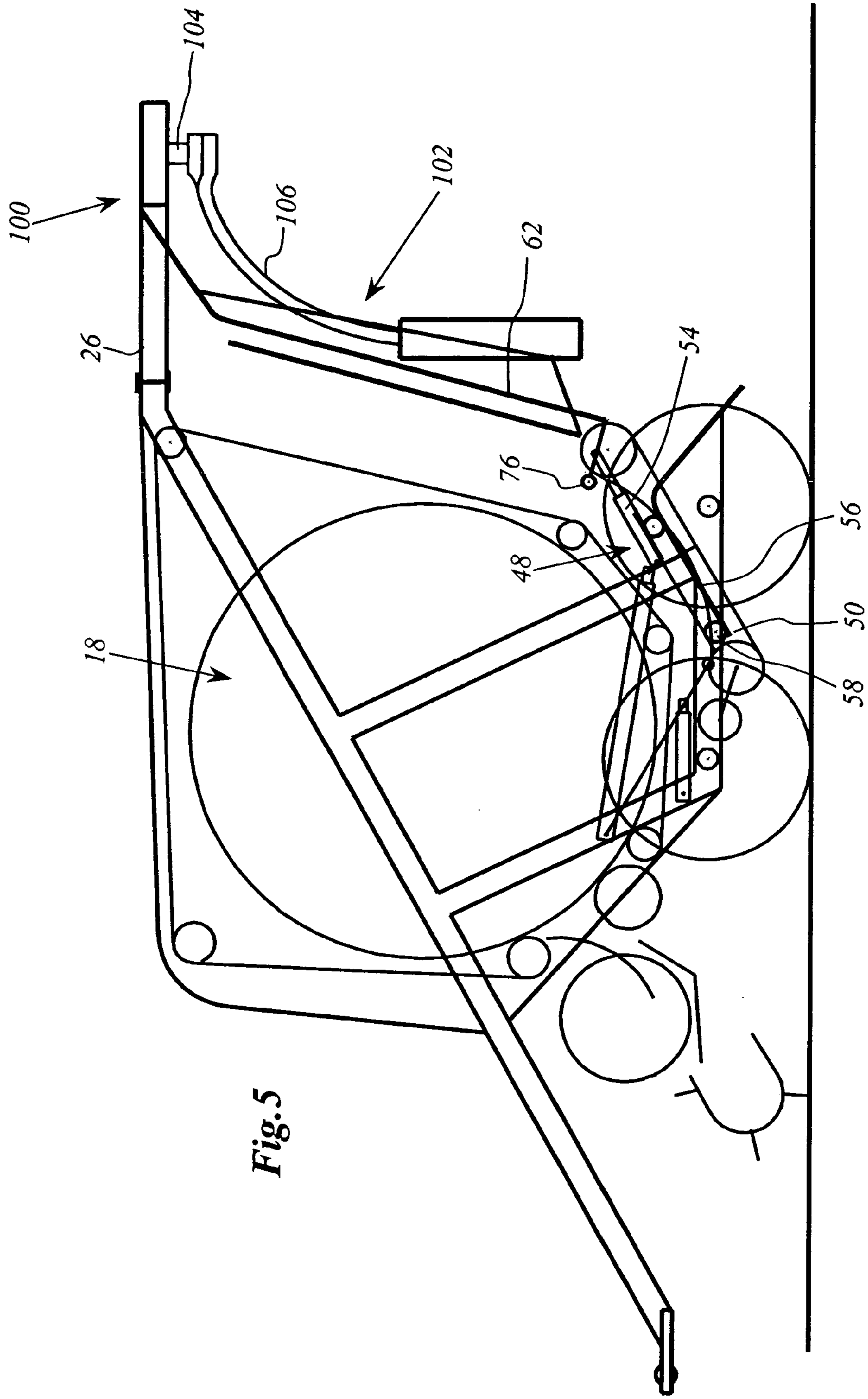
FIG. 5 shows the baler according to FIG. 1 in a bib-operating position of the wrapping implement.
Figure 6:
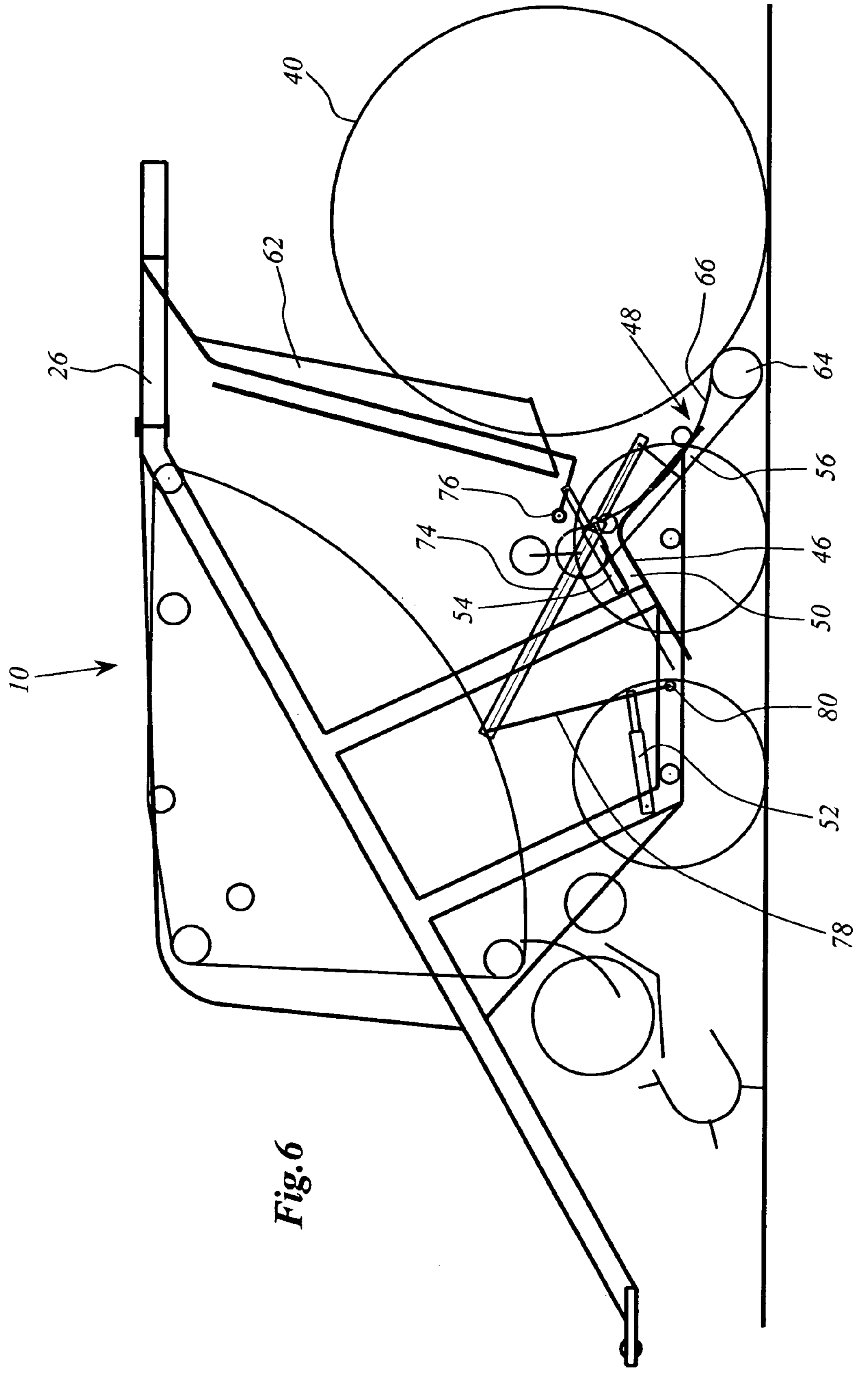
FIG. 6 shows the baler according to FIG. 5 in a position for unloading a bale.

FIGS. 5 and 6 make clear an alternate operation of the baler 10 in which a bale 40 formed in the baling chamber 18 is not wrapped by foil by means of the wrapping implement 100, but instead can be deposited on the ground immediately behind the baling chamber 18 by pivoting the conveying table 48.

Here, FIG. 5 shows a bale 40 that is finished and wrapped and is still located in the baling chamber 18. The slide 56 with the conveying table 48 is located underneath the baling chamber 18 in the position already described on the basis of FIG. 4. Here, the two rolls 58 of the slide 56 are located on the section of the ramp of the first guide 50 inclined to the front.

At this point, the wrapping implement 100 is located in a non-operating position that is made clear by the wrapping arms 102 that are folded inward and pivoted to the front into the direction towards the baling chamber 18. Simultaneously, the pivoting frame 62 and with it the second guide 72 are located in a non-operating position pivoted upward. It is pivoted upward by means of the second actuating arrangement 54 that has been actuated about its pivot axis 76 and is thereby located, as are the wrapping arms 102 of the wrapping implement 100, within the outer outline of the baler 10 as defined by the extension 26. In the non-operating position of the wrapping implement 100 shown, this thereby clearly exhibits more compact dimensions compared to pivoting frames 62 oriented horizontally and wrapping arms 102 pivoted to the outside.

The wrapping arms 102 are pivoted by means of servo motors, not shown, where they may be driven electrically or hydraulically.

FIG. 6 makes clear the movement to deposit the finished bale 40 on the ground by means of the conveying table 48 that is moved to the rear. For this purpose, the first actuating arrangement 52 is actuated through a certain stroke, on the one hand, so that the coupling rod 78 is pivoted in the direction of a rather vertical position. Simultaneously, the third actuating arrangement 74, that is connected in a joint to the coupling rod 78, is actuated through a certain path so that the slide 56 is moved through the central bend in the roof-shaped first guide 50 in the direction towards the section dropping off downward towards the rear. The rear roll of the two rolls 64 here almost touches the ground and the bale 40 is deposited on the ground which can be additionally supported, if necessary, by a rotation of the endless band 66.

This operation of the baler 10, shown in FIGS. 5 and 6 without the wrapping implement 100 is appropriate for operation on public roads as well as for operation without wrapping the finished bale 40 with foil.

Figure 7:
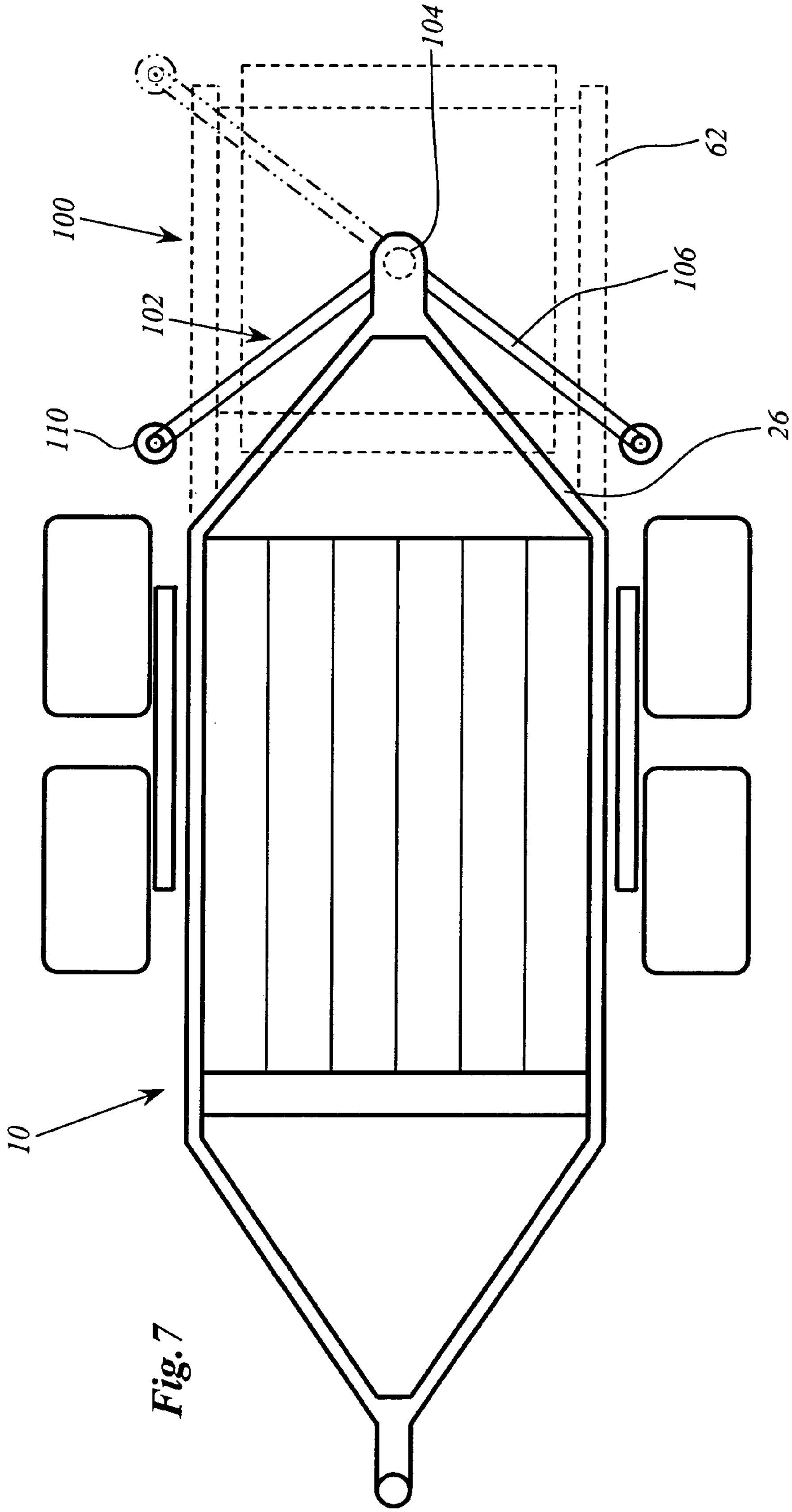
FIG. 7 shows a schematic plan view of the baler according to FIGS. 1 through 6.

FIG. 7 clarifies the two possible operating positions of the baler 10 on the basis of a plan view from above, where the operating position of the wrapping implement 100 is characterized by the wrapping arm 102 of the two wrapping arms 102, shown in dashed lines. The continuous lines clarify the wrapping arm 102 that is either folded inward or folded together in a non-operating position. By the same token, the pivoting frame 62 located in the horizontal position is indicated by dashed lines. In the non-operating position in the folded condition, the pivoting frame 62 is located within the rear outline of the baler 10 defined by the extension 26.

FIGS. 8 through 12 shown an alternative or a more generalized embodiment of the baler according to the invention that is provided with a further processing arrangement 120. The same components that are shown in FIGS. 1 through 7 are identified by the same part number call-outs, and are therefore not explained again.

Figure 8:
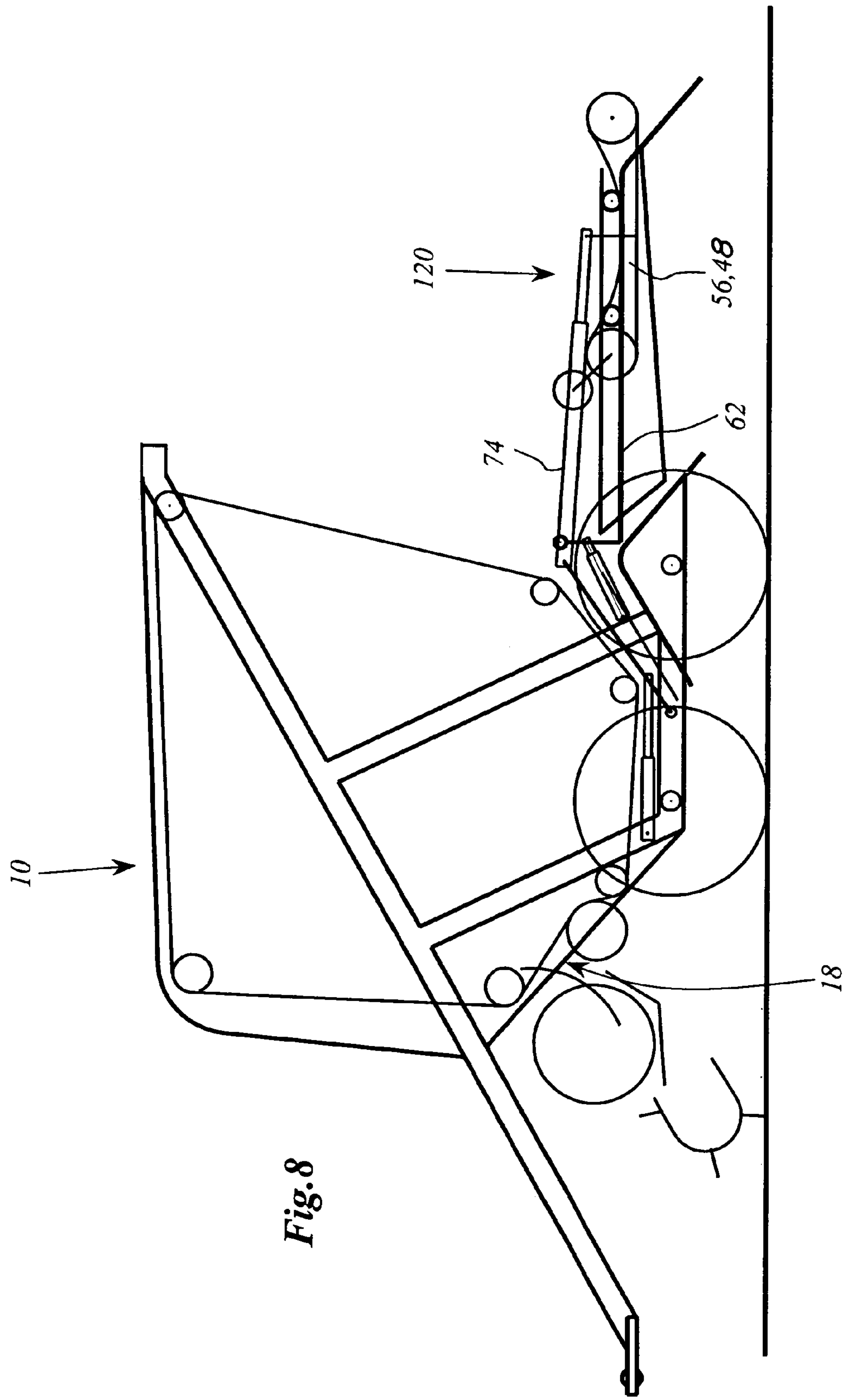
FIG. 8 shows a schematic side view of an alternative embodiment of a baler with a following further processing arrangement.

FIG. 8 shows a schematic side view of the baler 10 in the alternative embodiment. Here, the pivoting frame 62 is located in the horizontal operating position. The further processing arrangement 120 may, in particular, be a weighing arrangement of the like, that permits weighing of the bale 40 and further transmission of the data detected to a central on-board computer. In this way, a continuous detection of the masses already processed is possible. The further processing arrangement 120 may also include the wrapping implement 100 previously described or it may be configured as such. Otherwise, the illustration of FIG. 8 corresponds to the operating position described previously on the basis of FIG. 1, since the remaining components for repositioning and pivoting the conveying table 48, as well as the pivoting frame 62, are the same.

Figure 9:
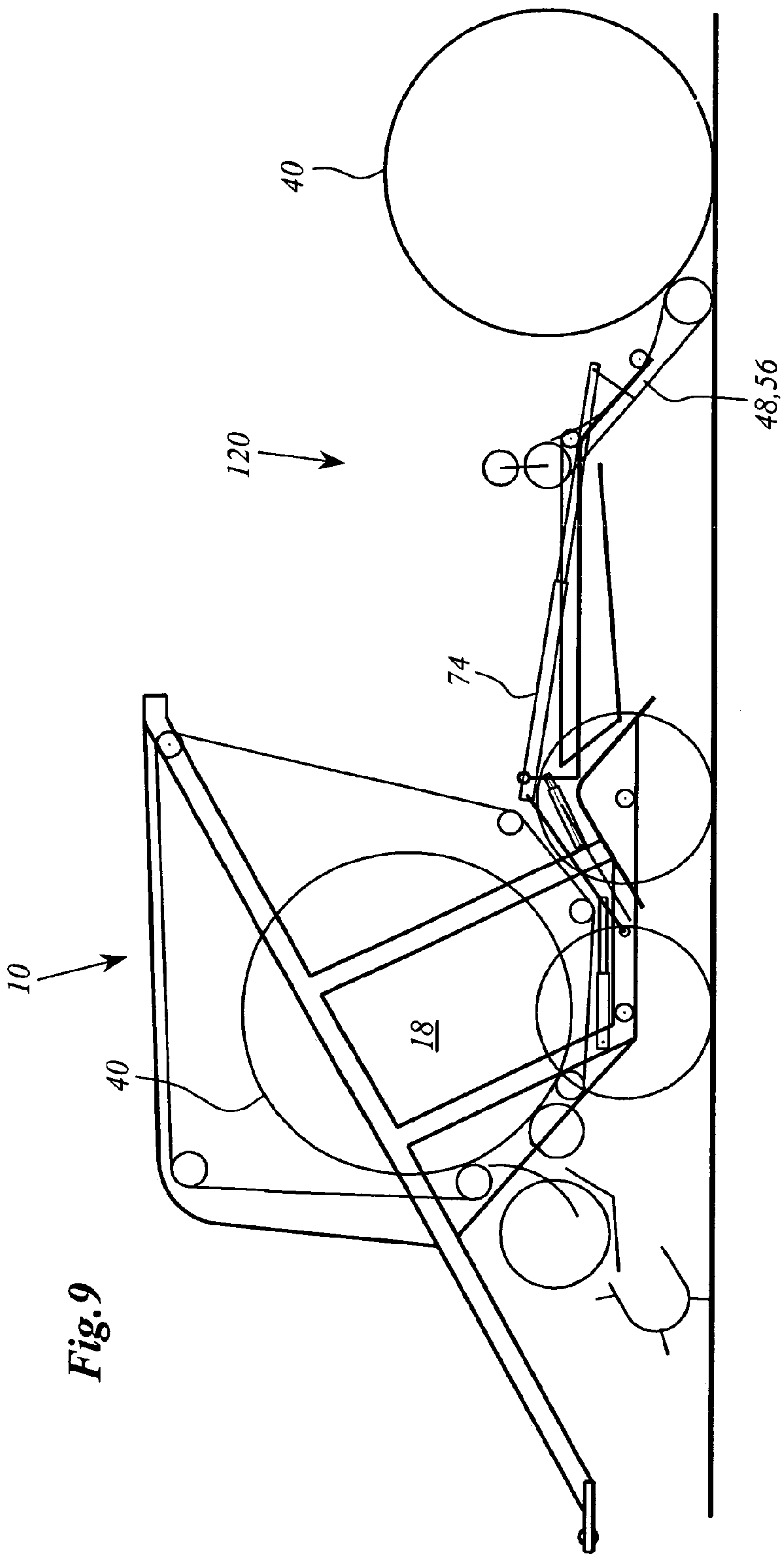
FIG. 9 shows the baler according to FIG. 8 in a position for unloading a bale.

FIG. 9 shows the deposit of a finished bale 40 on the ground behind the baler 10 that continues to operate and that has been detected by the further processing arrangement 120 that may, for example, weigh the bale 40. In its baling chamber 18, a partially finished bale 40 is already located.

Figure 10:
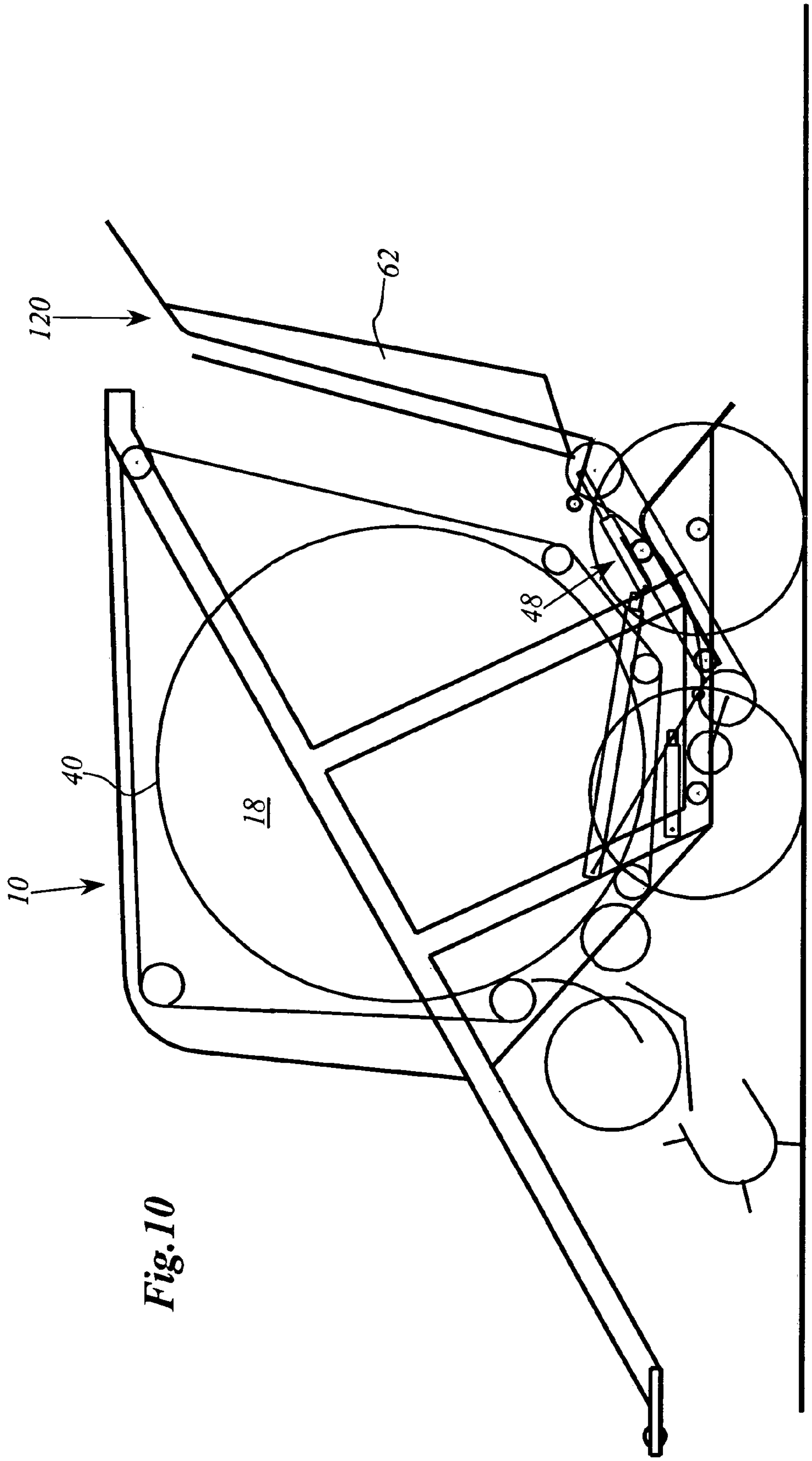
FIG. 10 shows the baler according to FIG. 8 in a non-operating position of the further processing arrangement.
Figure 11:
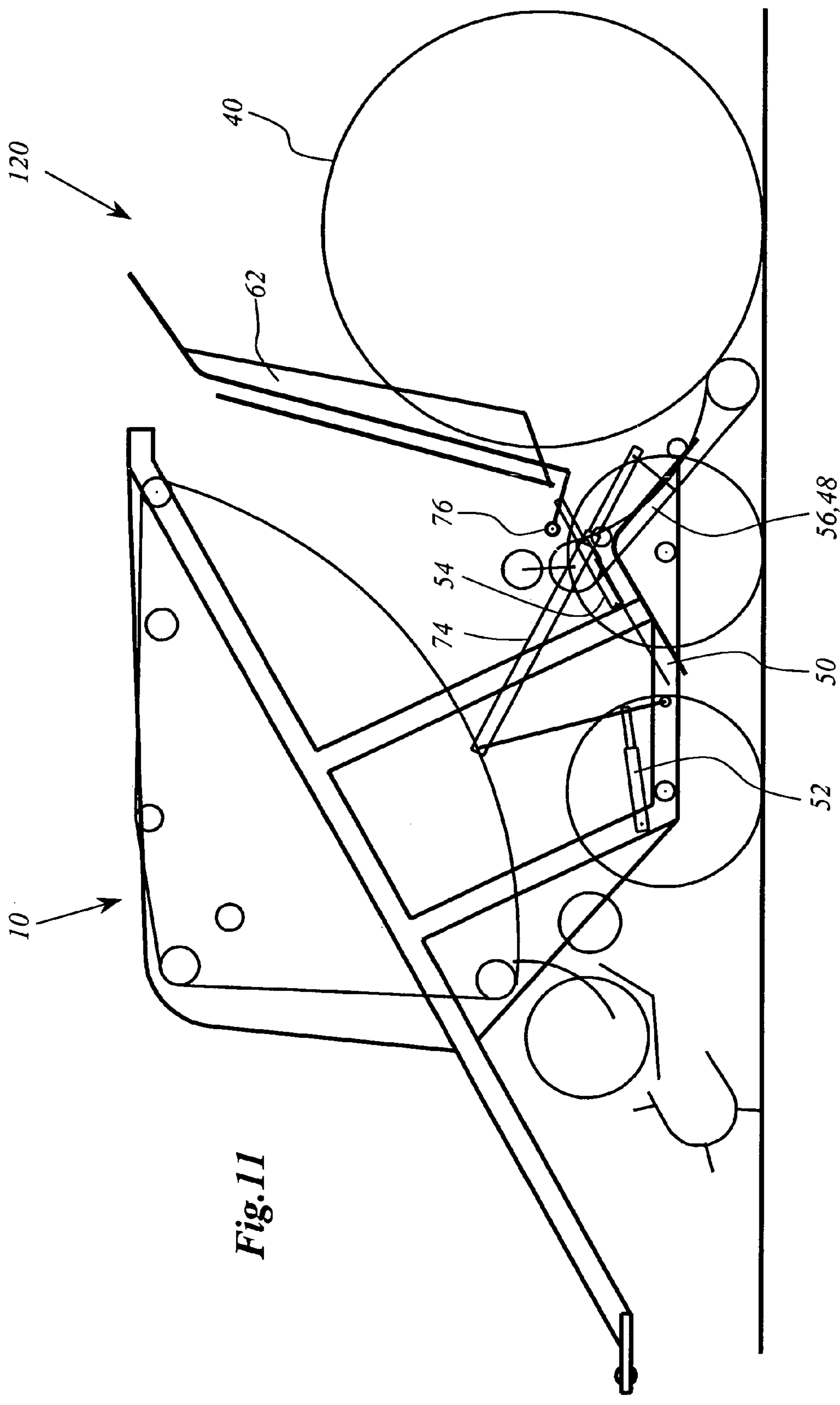
FIG. 11 shows the baler according to FIG. 10 in a position for unloading a bale.

FIGS. 10 and 11 show the alternative variation of the baler 10 without the use of the further processing arrangement 120, that is after the latter has essentially been disassembled. Immediately following this, the pivoting frame 62 is pivoted upward by means of the second actuating arrangement 54. The second guide 72 on the pivoting frame 62 has thereby been put out of operation and the slide 56 with the conveying table 48 is slid or pivoted only within the first guide 50. The illustration of FIG. 10 shows the conveying table 48 arranged underneath the baling chamber 18 and provided to take over a finished bale 40, and it can be pivoted after this downward and to the rear by actuation of the first and third actuating arrangements 52 and 74 (see FIG. 11). In this way, a bale 40 is deposited on the ground.

Figure 12:
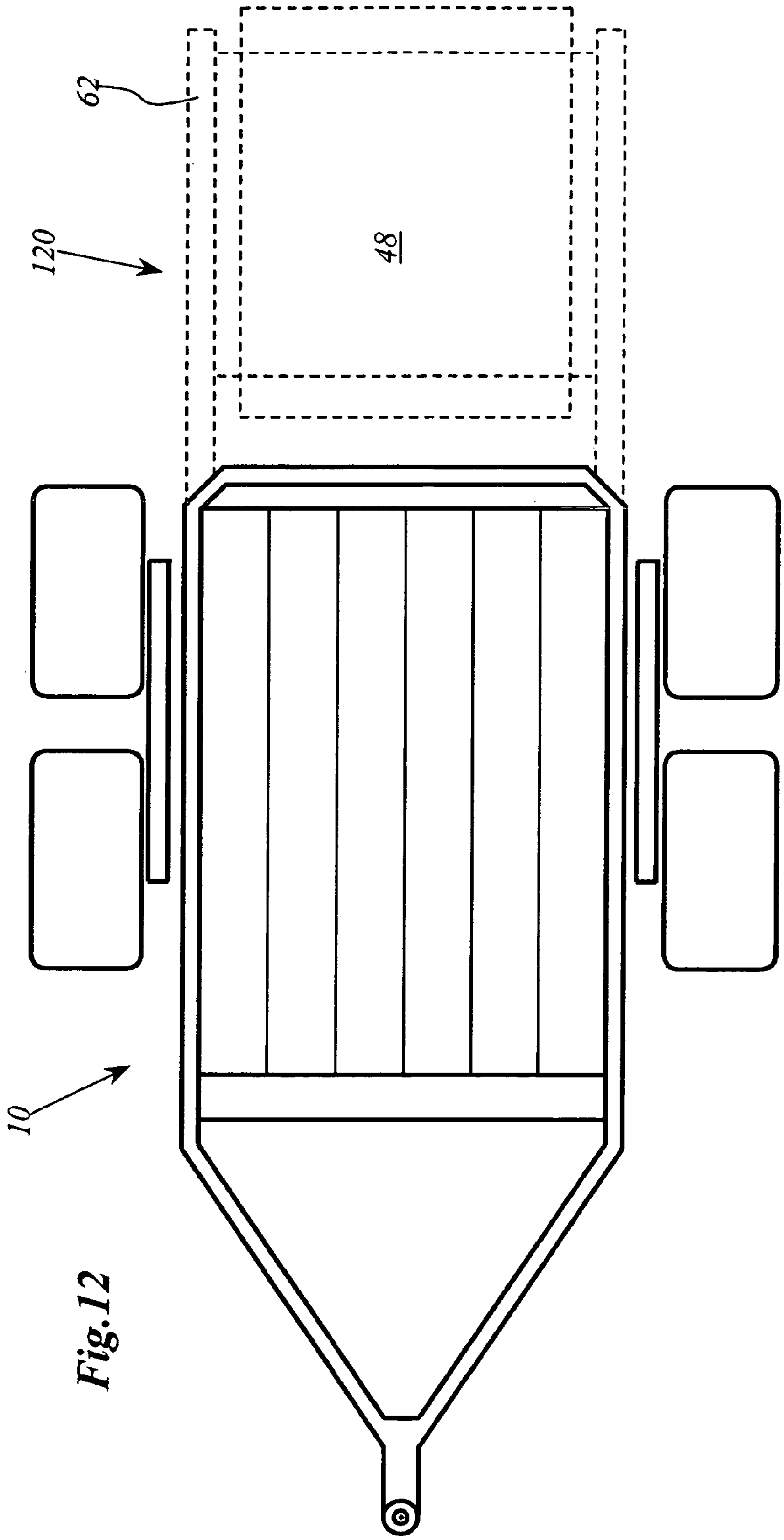
FIG. 12 shows a schematic plan view of the baler according to FIGS. 8 through 11.

FIG. 12 makes clear on the basis of a plan view from above the two possible operating positions of the second embodiment of the baler 10, where the operating position of the further processing arrangement 120 is characterized by a pivoting frame 62 that lies horizontally and is indicated by dashed lines. By the same token, the third actuating arrangement 74 is also indicated by dashed lines. In the non-operating condition in the folded position, the pivoting frame 62 and the third actuating arrangement 74 are located near the rear end of the baler 10.

Having described the preferred embodiment, it will become apparent that various modifications can be made without departing from the scope of the invention as defined in the accompanying claims.

What is claimed is:

1. In a large round baler including a baling chamber having an outlet, a further processing arrangement being mounted to the baler downstream of said outlet and including a conveying table mounted for movement along a guide arrangement between a first position adjacent said outlet for receiving a bale from said bale chamber, and a second position remote from said outlet, the improvement comprising: said guide arrangement including at least one section mounted for being moved into a non-operating position wherein it is within a length dimension defined by a remaining portion of said baler and a second section coupled to said at least one section for pivoting vertically between a generally horizontal, operating position and said non-operating position and said conveying table is supported by said at least one section of said guide arrangement when said second section is located in its non-operating position.

2. The large round baler, as defined in claim 1, wherein said further processing arrangement includes a wrapping arrangement, and said conveying table is a wrapping table of said wrapping arrangement.

3. The large round baler, as defined in claim 2, wherein said wrapping arrangement includes an inverted, generally U-shaped, wrap material dispensing arm assembly supported for pivoting about an upright axis located along a longitudinal center plane of said baler for operation in a region spaced rearwardly of said baling chamber.

4. The baler, as defined in claim 3, wherein said wrap material dispensing arm assembly includes a two-piece arm with each piece having an end mounted for pivoting about said upright axis, relative to the other piece, between a working position wherein respective second ends of the two pieces are separated by a distance at least equal to a width of said baling chamber, and a non-working position, wherein said second ends are spaced apart by a distance less than said width of said baling chamber.

* * * * *